3,437,553
GLASS LAMINATE
Robert Burleigh Hailstone, Wilmington, Del., assignor to E. I. du Pont de Nemours and Company, Wilmington, Del., a corporation of Delaware
No Drawing. Filed June 16, 1966, Ser. No. 557,907
Int. Cl. C03c 27/10; B32b 17/06
U.S. Cl. 161—199                7 Claims This invention relates to a new and improved safety-glass laminate, the improved interlayer used therein and the technique of producing such improved interlayer.

Safety-glass laminates used for automobile windshields conventionally are formed from two sheets of glass from about 60 to 150 mils thick and generally about 120 mils in thickness, an interlayer of polyvinyl butyral from about 10 to 60 mils thick and generally 15 to 30 mils thick. A discussion of the requirements of such safety-glass can be found in U.S. Patent No. 2,946,711, issued July 26, 1960 to Chester Griswold Bragaw, Jr. and William Goodrich Simeral.

In recent years it has been found that the penetration resistance of safety-glass laminates when impacted can be improved markedly by controlling the degree of adhesion of the interlayer to glass. Generally, this involves lowering the adhesion of the interlayer to the glass from that of conventional plasticized polyvinyl butyral to glass.

Polyvinyl butyral is formed by reacting butyraldehyde with polyvinyl alcohol. The alcohol groups left unreacted are calculated as the percent vinyl alcohol remaining in the polymer. Present-day safety-glass laminates are made using an interlayer whose base resin is composed of a polyvinyl alcohol partially condensed with butyraldehyde so that it contains from 15% to 30% of unreacted hydroxyl groups calculated as weight percent of vinyl alcohol, less than 3% by weight of ester groups calculated as weight percent of vinyl acetate and the remainder af acetal groups calculated as vinyl butyral. This material is commonly called "polyvinyl butyral" or more exactly "partial polyvinyl butyral." Conventionally, polyvinyl butyral, as used in safety-glass laminates, contains a plasticizer. Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80–90% caprylic acid and 10–20% capric acid as described in U.S. Patent No. 2,372,522, dimethyl phthalate, dibutyl phthalate, di(butoxyethyl)sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers are suitable for use in the present invention but do not represent all the known plasticizers which can be used. Such a list would be impractical and would serve no purpose since one skilled in the art can readily select a plasticizer from the many already known. It has been found preferable to use from 34 parts to 52 parts of plasticizer for every 100 parts by weight of polyvinyl butyral for purposes of the present invention.

The present invention is directed at improving the strength properties of safety-glass laminates by controlling the adhesion of the interlayer to the glass. When safety-glass laminate is struck with a blunt object, the breakthrough strength of the laminate is principally controlled by the strength of the interlayer and its ability to absorb the energy of the impact. When an impact is suffered by a safety-glass laminate in which the glass adheres too tenaciously to the interlayer, the amount of interlayer between cracks in the glass becomes small and is not as capable of absorbing the impact energy as when an interlayer having somewhat reduced adhesion to the glass is used which results in the formation of larger areas between cracks in the glass and the availability of a larger amount of interlayer to absorb the energy of the impact. However, the adhesion of the interlayer to the glass must not be reduced to the point where chunks of glass come loose from the interlayer when the laminate suffers an impact.

A convenient test for measuring the adhesion of safety-glass interlayers to glass has been devised and is known as the peel adhesion test. This test comprises laminating a 6 by 12 inch sheet of polyvinyl butyral, 30 mils thick, between two sheets of glass 6 inches wide, and 12 inches long under conventional conditions except that a 5 mil polyethylene terephthalate film is interposed between the polyvinyl butyral and one of the sheets of glass. The construction is laminated in an oil autoclave under 225 p.s.i. pressure at 135° C. for 9 minutes. After the lamination operation, the laminate is cut into strips 6 by 1 inch and the polyethylene terephthalate film and the glass adjacent said film are removed. Then the polyvinyl butyral film is peeled back from one of the ends of the remaining glass sheet and the amount of pull at 180° necessary to part it from the glass measured, using an "Instron" tensile testing machine. The adhesion is reported as lb./inch at a thickness of 30 mils.

Thirty mil conventional polyvinyl butyral having 22–23% hydroxyl groups calculated as weight percent vinyl alcohol requires a force of about 20 lbs./in. to peel it away from the glass in the above test. A peel adhesion value of about 6 to 13 lbs./in. is considered ideal for 30 mil sheeting. A piece of safety-glass formed with a polyvinyl butyral interlayer having an adhesion to glass of below about 6 lbs./in. as defined in the above test will permit pieces of glass to fly out when the laminate is shattered by impact. Marked increase in the strength of safety-glass laminates are observed when the polyvinyl butyral to glass adhesion is reduced to the 6 to 13 lbs./in. range in the above defined test. The moisture level in commercial sheeting is 0.2 to 0.8% and the preferred peel strengths are to be obtained at moisture levels in this range. The peel adhesion as measured varies for similarly treated sheeting of a different thickness. For instance, to convert peel adhesion of a 30 mil interlayer to the equivalent adhesion for a 15 mil interlayer, one uses the formula $$PA_{30} = PA_{15}\left(\frac{30}{15}\right)^{2/3}$$

wherein PA is the peel adhesion in lbs. per inch.

A method for determining the impact resistance of safety-glass laminates is known as the Phantom Test. The test is carried out by dropping a 22 pound hard, maple, headform onto a laminated glass specimen which measures 14¼ inches by 43¼ inches at from 20 to 23° C.

The specimen is mounted on a rigid steel frame supported from the floor by a steel framework and is held in place by an upper hinged frame. The inner surfaces of the frame, in contact with the glass, are covered with a flat rubber gasket to simulate the windshield mounting. The upper frame is held securely against the glass by two 60 pound weights resting on cross members of the frame. The "daylight" opening of the upper and lower frame measures 13¼ inches by 42¼ inches.

The headform is a 6.7 inch diameter sphere on which is mounted a hard, maple block 4.7 inches square by 20 inches in length simulating the shoulders. The headform is covered with a ¼ inch layer of felt and the weight of the entire assembly is adjusted to 22 pounds by weighting with lead shot.

Ten to fifteen specimens are impacted by dropping the headform magnetically from various heights. The height from which the headform is dropped is increased one foot if the preceding specimen supports the headform or decreased one foot if the preceding specimen does not support the headform. The height at which 50% of the samples fail is then determined statistically.

In the present invention, a polyvinyl butyral sheet, which is to be used as a safety-glass interlayer, is treated with an aqueous solution of a wetting agent. When such wetting agent is applied in accordance with this invention, it forms on the polyvinyl butyral as a substantially monomolecular layer, which interferes with the reactive polyvinyl butyral groups directly adhering to the glass and thus permits control of the adhesion level. By thus reducing the adhesion of the interlayer to the glass, the impact resistance of a treated safety-glass laminate can be increased.

The general requirement of the wetting agent is that such wetting agent can be applied to polyvinyl butyral in a substantially monomolecular layer.

A preferred class of nonionic wetting agents, have the formula

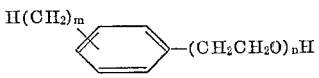

wherein $m$ is an integer of from 10 to 25 and preferably from 12 to 25 and $n$ is an integer of from 4 to 25.

The various suitable substituents in the wetting agents of this invention represent those substituents which can produce the solubility in water necessary to form a substantially monomolecular layer of the wetting agent on the polyvinyl butyral base without the formation of micelles. That is, they have a critical micelle formation concentration in water above the aqueous solution concentration necessary to produce a substantially monomolecular layer on polyvinyl butyral. The aqueous concentration of wetting agent necessary to produce a monomolecular layer on polyvinyl butyral is generally about 0.04% by weight wetting agent in water but varies with different wetting agents from 0.01 weight percent to 0.15 weight percent.

The following examples are illustrative of the invention.

In Table I, the interlayers were prepared from conventional commercial polyvinyl butyral sheeting. The interlayers were dipped at room temperature for one to five minutes in a solution of the wetting agent indicated of the indicated concentration. The interlayers were then hung up and drip-dried overnight. The percent $H_2O$ indicates the amount of water in the sheeting as dipped. The Phantom Test samples were laminated by being run through squeeze rolls followed by treatment in an air autoclave. The peel strength samples were prepared as indicated above in the description of the peel strength test.

TABLE I

| Example | Wetting agent | Concentration, percent | Peel adhesion, lbs./inch | $H_2O$, percent | Break height (inches) | Interlayer thickness (mils) |
|---|---|---|---|---|---|---|
| 1 | None, control | | 10–12 | | 26 | 15 |
| 2 | $C_{12}H_{25}$—⟨ ⟩—$(CH_2CH_2O)_{6-10}$—H | 1 | 5.8 | 1.35 | 49 | 15 |
| 3 | None, control | | 20 | 1.34 | 58 | 30 |
| 4 | $C_{12}H_{25}$—⟨ ⟩—$(CH_2CH_2O)_{6-10}$—H | 1 | | 1.33 | >72 | 30 |
| 5 | Sodium tetradecyl sulfate | 0.1 | 7.0 | 1.26 | | 15 |
| 6 | Sodium heptadecyl sulfate | 0.1 | 4.8 | 1.32 | | 15 |

I claim:

1. A process of reducing the adhesion of a polyvinyl butyral sheet to glass which comprises the steps of wetting the polyvinyl butyral sheet with an aqueous solution of a wetting agent selected from the class consisting of:

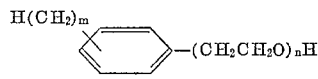

wherein $m$ is an integer of from 10 to 18 and $n$ is an integer of from 4 to 25; and alkali metal alkyl sulfates, wherein the alkyl group contains from 10 to 20 carbon atoms to form a substantially monomolecular layer of said wetting agent on the surface of said polyvinyl butyral sheet.

2. The process of claim 1 wherein the aqueous solution concentration of nonionic wetting agent is from 0.01 to 0.15 percent by weight.

3. The process of claim 2 wherein the wetting agent has the formula

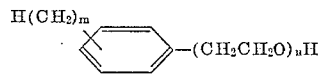

wherein $m$ is an integer of from 10 to 18 and $n$ is an integer of from 4 to 25.

4. The process of claim 3 wherein the wetting agent has the formula

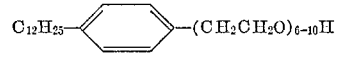

5. A safety-glass laminate formed of two glass sheets and having a polyvinyl butyral interlayer, which interlayer has been surfaced with a substantially monomolecular layer of a wetting agent selected from the class consisting of:

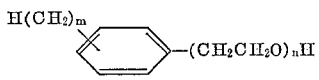

wherein $m$ is an integer of from 10 to 18 and $n$ is an integer of from 4 to 25; and alkali metal alkyl sulfates, wherein the alkyl group contains from 10 to 20 carbon atoms, in which the adhesion between the glass and the interlayer for a test strip 3 cm. wide is between 6 and 13 pound in a 180° direction.

6. The safety-glass laminate of claim 5 wherein the wetting agent has the formula

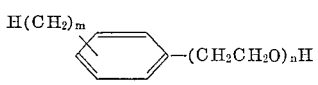

wherein $m$ is an integer of from 10 to 18 and $n$ is an integer of from 4 to 25.

7. The safety-glass laminate of claim 6 wherein the wetting agent has the formula

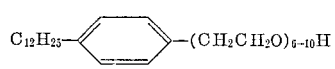

References Cited

German printed application: Winkler et al., December 1965, Auslegeschift, 1,206,123.

ROBERT F. BURNETT, *Primary Examiner.*

W. J. VAN BALEN, *Assistant Examiner.*

U.S. Cl. X.R.

260—73; 156—106